(12) United States Patent
Plante et al.

(10) Patent No.: US 11,092,201 B2
(45) Date of Patent: Aug. 17, 2021

(54) MULTIPLE MR FLUID CLUTCH APPARATUSES SHARING MR FLUID

(71) Applicant: EXONETIK INC., Sherbrooke (CA)

(72) Inventors: Jean-Sebastien Plante, Sherbrooke (CA); Pascal Larose, Sherbrooke (CA); Marc Denninger, Sherbrooke (CA); Guifre Julio, Sherbrooke (CA)

(73) Assignee: EXONETIK INC., Sherbrooke (CA)

( * ) Notice: Subject to any disclaimer, the term of this patent is extended or adjusted under 35 U.S.C. 154(b) by 202 days.

(21) Appl. No.: 16/340,556

(22) PCT Filed: Oct. 13, 2017

(86) PCT No.: PCT/CA2017/051216
§ 371 (c)(1),
(2) Date: Apr. 9, 2019

(87) PCT Pub. No.: WO2018/068145
PCT Pub. Date: Apr. 19, 2018

(65) Prior Publication Data
US 2019/0257372 A1  Aug. 22, 2019

Related U.S. Application Data

(60) Provisional application No. 62/407,741, filed on Oct. 13, 2016.

(51) Int. Cl.
*F16D 27/12* (2006.01)
*F16D 25/12* (2006.01)
(Continued)

(52) U.S. Cl.
CPC .......... *F16D 25/126* (2013.01); *F16D 27/12* (2013.01); *F16D 27/14* (2013.01); *F16D 37/008* (2013.01);
(Continued)

(58) Field of Classification Search
CPC .......... F16D 27/12; F16D 27/14; F16D 37/02; F16D 37/008; F16D 2037/007; F16D 2500/10475; F16H 15/01
See application file for complete search history.

(56) References Cited

U.S. PATENT DOCUMENTS 2,686,475 A  8/1954  Corbett
2,752,800 A  7/1956  Raymond et al.
(Continued)

FOREIGN PATENT DOCUMENTS

CN  103 161 846 A  6/2013
DE  101 08 533 A1  9/2002
DE  10 2009 007209 A1  8/2010

*Primary Examiner* — Huan Le
(74) *Attorney, Agent, or Firm* — Norton Rose Fulbright Canada LLP

(57) ABSTRACT

A system comprises magnetorheological fluid clutch apparatuses, each magnetorheological fluid clutch apparatus including a first rotor having at least one first shear surface, a second rotor rotating about a common axis with the first rotor, the second rotor having at least one second shear surface opposite the at least one first shear surface, the shear surfaces separated by at least one annular space, magnetorheological (MR) fluid in an MR fluid chamber including the at least one annular space, the MR fluid configured to generate a variable amount of torque transmission between the rotors when subjected to a magnetic field, and coil(s) actuatable to deliver a magnetic field through the MR fluid such that each said magnetorheological fluid clutch apparatus is actuatable to selectively transmit actuation by controlled slippage of the rotors with respect to one another. The MR fluid chambers of the second magnetorheological fluid clutch apparatuses are in fluid communication for the MR fluid to circulate between the magnetorheological fluid clutch apparatuses.

15 Claims, 8 Drawing Sheets

(51) Int. Cl.
*F16D 27/14* (2006.01)
*F16D 37/00* (2006.01)
*F16H 15/01* (2006.01)
*F16D 37/02* (2006.01)

(52) U.S. Cl.
CPC ............ *F16D 37/02* (2013.01); *F16H 15/01* (2013.01); *F16D 2037/007* (2013.01); *F16D 2500/10475* (2013.01)

(56) References Cited

U.S. PATENT DOCUMENTS

| | | | |
|---|---|---|---|
| 5,094,328 A * | 3/1992 | Palmer | F16D 37/008 188/274 |
| 6,183,386 B1 * | 2/2001 | Duggan | F16D 37/02 192/21.5 |
| 6,585,616 B1 | 7/2003 | Robinson | |
| 8,127,907 B1 | 3/2012 | White | |
| 2006/0052198 A1 * | 3/2006 | Namuduri | F16H 48/10 475/5 |
| 2012/0085613 A1 * | 4/2012 | Bose | F16D 37/02 192/21.5 |
| 2013/0098187 A1 * | 4/2013 | Pittini | F16D 37/02 74/331 |
| 2015/0217865 A1 | 8/2015 | Spina et al. | |

* cited by examiner

MULTIPLE MR FLUID CLUTCH APPARATUSES SHARING MR FLUID

CROSS-REFERENCE TO RELATED APPLICATION

The present application claims the priority of U.S. Patent Applications Provisional Application No. 62/407,741, filed on Oct. 13, 2016 and incorporated herein by reference.

FIELD OF THE APPLICATION

The present application relates generally to magnetorheological (MR) fluid clutch apparatuses, and more particularly, to MR fluid management.

BACKGROUND OF THE ART

State-of-the-art distributed power devices rely on hydraulics or electromagnetic actuation. Hydraulic actuation is reliable towards mechanical jam, but has fundamentally limited dynamic response and efficiency. Furthermore, implementation of hydraulic systems into commercial applications may be problematic as hydraulics are prone to leakage, leading to increased maintenance costs. Moreover, hydraulic actuation is hardware intensive.

Electromagnetic actuation offers an alternative to hydraulic actuation. For high dynamic applications, the most common form of electromechanical actuation is found in direct-drive motors, which are prohibitively heavy. Device weight can be considerably reduced by providing a reduction ratio between the motor and the end-effector. Indeed, when coupled to reduction gearboxes, electromechanical actuators are lighter and less expensive than direct drive solutions, but their high output inertia, friction and backlash may diminish their dynamic performance.

MR fluid clutch apparatuses are known as an alternative solution for transmitting motion from a drive shaft with precision and accuracy, among other advantages, which can serve to enhance the performance of electromechanical actuation systems.

MR fluid is known to change properties over time. These changes may include, non-exhaustively, a change in viscosity, a change in the ability to transmit a shear stress in function of the magnetic flux density in the MR fluid, and a change of magnetic permeability. One factor contributing to change of properties is the energy dissipated in the fluid when the fluid is solicited in a shear situation. A shear situation of the fluid occurs when torque is transmitted by the MR fluid clutch apparatus while an angular speed difference is present between the input and the output of the MR fluid clutch apparatus and is known also as slippage. In this condition, the apparent yield shear stress of the MR fluid in the interface between the input and the output of the MR fluid clutch apparatus controls the torque transmitted from the input of the MR fluid clutch apparatus to its output. In such a shear situation, the MR fluid absorbs energy that may be proportional to the speed difference and the torque transmitted from the input to the output. The higher the transmitted torque of the MR fluid clutch apparatus and the higher the angular speed between the input rotor and the output rotor, the more energy may be dissipated in the MR fluid and the greater the properties of the MR fluid may change over time.

SUMMARY OF THE APPLICATION

It is therefore an aim of the present disclosure to provide a novel arrangement of MR fluid clutches sharing MR fluid.

Therefore, in accordance with a first embodiment of the present application, there is provided a system comprising: at least a first and a second magnetorheological fluid clutch apparatuses, each said magnetorheological fluid clutch apparatus including at least a first rotor having at least one first shear surface, a second rotor rotating about a common axis with the first rotor, the second rotor having at least one second shear surface opposite the at least one first shear surface, the shear surfaces separated by at least one annular space, magnetorheological (MR) fluid in an MR fluid chamber including the at least one annular space, the MR fluid configured to generate a variable amount of torque transmission between the rotors when subjected to a magnetic field, and at least one coil actuatable to deliver a magnetic field through the MR fluid such that each said magnetorheological fluid clutch apparatus is actuatable to selectively transmit actuation by controlled slippage of the rotors with respect to one another; and the MR fluid chambers of at least the first and the second magnetorheological fluid clutch apparatuses being in fluid communication for the MR fluid to circulate between at least the first and the second magnetorheological fluid clutch apparatuses.

Further in accordance with the first embodiment, a single casing is for instance provided for the magnetorheological fluid clutch apparatuses, the single casing defining a single MR fluid chamber combining the MR fluid chambers of the magnetorheological fluid clutch apparatuses to form a single pool of MR fluid.

Still further in accordance with the first embodiment, the single casing defines for instance the second rotor of both the first and the second magnetorheological fluid clutch apparatuses.

Still further in accordance with the first embodiment, the first rotor of one of the first and the second magnetorheological fluid clutch apparatuses is for instance fixed to brake the second rotor.

Still further in accordance with the first embodiment, the common axes of the magnetorheological fluid clutch apparatuses are for instance parallel and non-collinear.

Still further in accordance with the first embodiment, input members of each of the first rotors are for instance on a first side of the casing, and driven members of each of the second rotors are on a second side of the casing.

Still further in accordance with the first embodiment, at least one conduit is for instance between the the MR fluid chamber of the first MR fluid clutch apparatus and the MR fluid chamber of the second MR fluid clutch apparatus, for MR fluid flow therethrough.

Still further in accordance with the first embodiment, a device is for instance in the at least one conduit for inducing the MR fluid flow between the MR fluid chambers.

Still further in accordance with the first embodiment, at least one of the magnetorheological fluid clutch apparatuses further comprises for instance a stator adapted to be connected to a structure, the stator having at least an annular wall, the first rotor and the second stator rotatably mounted to the stator, an inner magnetic core and an outer magnetic core with an annular cavity therebetween receiving the annular wall of the stator, the inner magnetic core and the outer magnetic core connected to at least one of the rotors to rotate therewith so as to be rotatably mounted to the stator, outer and inner fluid gaps between the inner magnetic core and the annular wall, and between the outer magnetic core and the annular wall, the outer and inner fluid gaps filled with at least one fluid other than the MR fluid, and wherein the magnetic field from the at least one coil follows a path comprising the annular wall, the outer fluid gap, the outer magnetic core, the at least one first shear surface and the at least one second shear surface, the inner magnetic core and the inner fluid gap.

Still further in accordance with the first embodiment, at least one pumping feature is for instance in at least one of the MR fluid chambers to cause a flow of the MR fluid.

Still further in accordance with the first embodiment, the pumping feature is for instance on one of the first rotor and the second rotor.

Still further in accordance with the first embodiment, the pumping feature is for instance at least one groove in at least one of the shear surfaces.

Still further in accordance with the first embodiment, a reservoir for MR fluid is for instance in fluid communication with at least one MR fluid chamber.

Still further in accordance with the first embodiment, the reservoir is for instance connected to the at least one MR fluid chamber by a conduit.

Still further in accordance with the first embodiment, the at least one coil is for instance a wireless power transmission coil.

In accordance with a second embodiment of the present disclosure, there is provided a method for operating a system of magnetorheological (MR) fluid clutch apparatuses comprising: actuating a first coil to deliver a magnetic field through MR fluid in a first MR fluid clutch apparatus to selectively transmit actuation by the first MR fluid clutch apparatus; actuating a second coil to deliver a magnetic field through MR fluid in a second MR fluid clutch apparatus to selectively transmit actuation by the second MR fluid clutch apparatus; and causing a portion of the MR fluid in the MR fluid clutch apparatus to flow to the second MR fluid clutch apparatus.

Further in accordance with the second embodiment, causing a portion of the MR fluid in the first MR fluid clutch apparatus to flow to the second MR fluid clutch apparatus includes for instance pumping the portion of the MR fluid.

Still further in accordance with the second embodiment, pumping the portion of MR fluid includes for instance pumping the portion of the MR fluid by a pump in a conduit fluidly connecting the MR fluid clutch apparatuses.

Still further in accordance with the second embodiment, pumping the portion of MR fluid includes for instance pumping the portion of the MR fluid by at least one pumping feature on at least one shear surface of at least one of the MR fluid clutch apparatuses.

Still further in accordance with the second embodiment, causing a portion of the MR fluid in the MR fluid clutch apparatus to flow to the second MR fluid clutch apparatus includes for instance having the MR fluid clutch apparatuses share a common pool of MR fluid.

DESCRIPTION OF THE PREFERRED EMBODIMENTS

Figure 1:
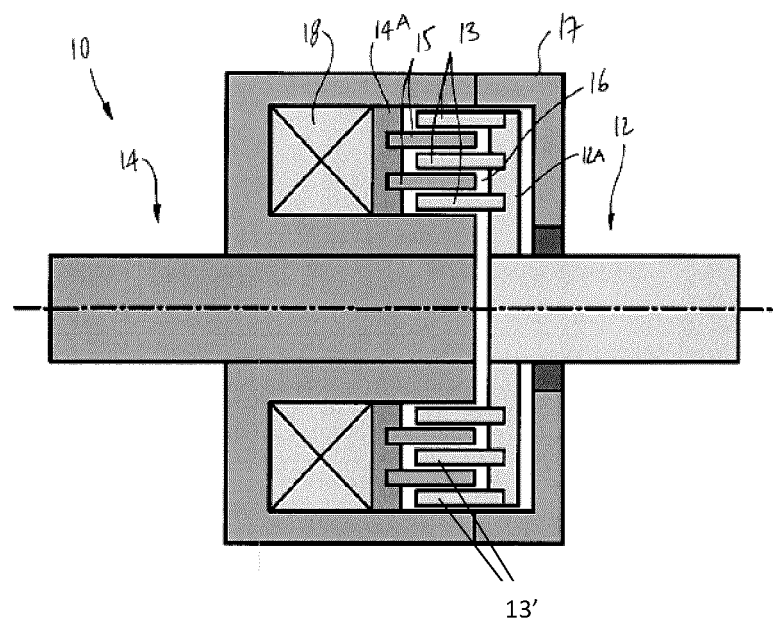
FIG. 1 is a schematic sectioned view of a MR fluid clutch apparatus used in systems of the present disclosure.

Referring to the drawings and more particularly to FIG. 1, there is illustrated a generic magnetorheological (MR) fluid clutch apparatus 10 configured to provide a mechanical output torque based on a received input current. The MR fluid clutch apparatus 10 of FIG. 1 is a simplified representation of a MR fluid clutch apparatus that may be used in the systems described hereinafter. It is to be noted that for simplicity purposes, all the description hereinafter will be done using MR fluid clutch apparatuses where drums are used to transmit load between the input and the output but that MR fluid clutch apparatuses of plates type may also be used. The MR fluid clutch apparatus that is used in the systems described hereinafter may have additional components and features, such as plates, redundant electromagnets, MR fluid expansion systems, etc.

The MR fluid clutch apparatus 10 has a driving member 12 with a disc 12A (or disk) featuring radial drums 13, this assembly also known as input rotor. The MR fluid clutch apparatus 10 also has a driven member 14 with a disc 14A having drums 15 intertwined with the drums 13 to define one or more cylindrical chamber(s) filled with an MR fluid 16, the cylindrical chamber(s) being delimited by a casing 17 that is integral to the driven member 14. The assembly of the driven member 14 and drums 15 is also known as the output rotor. In the example of FIG. 1, the driving member 12 may be an input shaft in mechanical communication with a power input, and the driven member 14 may be in mechanical communication with a power output (i.e., force output, torque output). MR fluid 16 is a type of smart fluid that is composed of magnetisable particles disposed in a carrier fluid, usually a type of oil. When subjected to a magnetic field, the fluid may increase its apparent viscosity, potentially to the point of becoming a viscoplastic solid. The apparent viscosity is defined by the ratio between the operating shear stress and the operating shear rate of the MR fluid comprised between opposite shear surfaces—i.e., that of the drums 13 on the drive side, and that of the drums 15 and of the walls of the casing 17 in the cylindrical chamber. The magnetic field intensity mainly affects the yield shear stress of the MR fluid. The yield shear stress of the fluid (a.k.a., the yield stress) when in its active ("on") state may be controlled by varying the magnetic field intensity produced by electromagnet 18 integrated in the casing 17, i.e., the input current, via the use of a controller. Otherwise, the MR fluid clutch apparatus 10 of FIG. 1 is in a normally open state in that, without powering of the electromagnet 18, the MR fluid clutch apparatus 10 is open and does not transmit torque. Accordingly, the MR fluid's ability to transmit force can be controlled with the electromagnet 18, thereby acting as a clutch between the members 12 and 14. The electromagnet 18 is configured to vary the strength of the magnetic field such that the friction between the members 12 and 14 may be low enough to allow the driving member 12 to freely rotate relative to the driven member 14 and vice versa. When the transmitted torque is inferior to the one the yield stress is able to produce, the speed of the driven member 14 is the same than the input member 12 and the amount of power that the fluid has to dissipate may be reduced. In a shear situation, some torque is transmitted, but there is a relative speed between the input member 12 and the driven member 14. The MR fluid allows slippage of the input member 12 relative to the driven member 14, that may affect the properties of the MR fluid over time. It bears mentioning that the MR fluid clutch apparatus 10 may be without the drums 13 and 15, and really instead on the discs 12A and 14A to form the shear surfaces. Moreover, surface features, such as a helix groove may be defined in at least some of the rotating surfaces of the input member 12 or driven member 14, to induce a movement of the MR fluid 16.

Figure 2A:
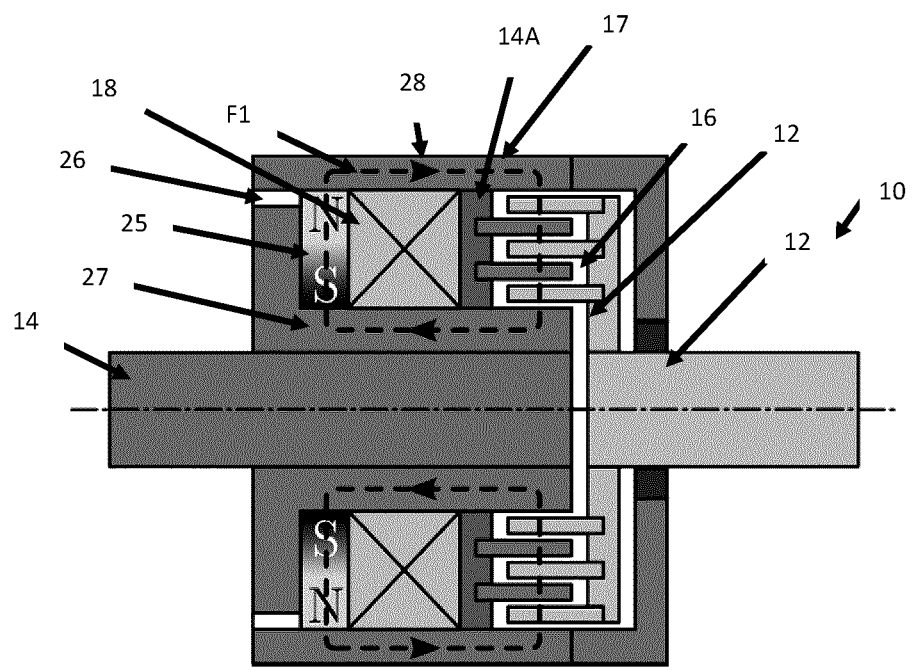
FIG. 2A is a partly sectioned view of the MR fluid clutch apparatus with a permanent magnet with a coil in an unpowered state, that may be used in systems in accordance with the present disclosure.
Figure 2B:
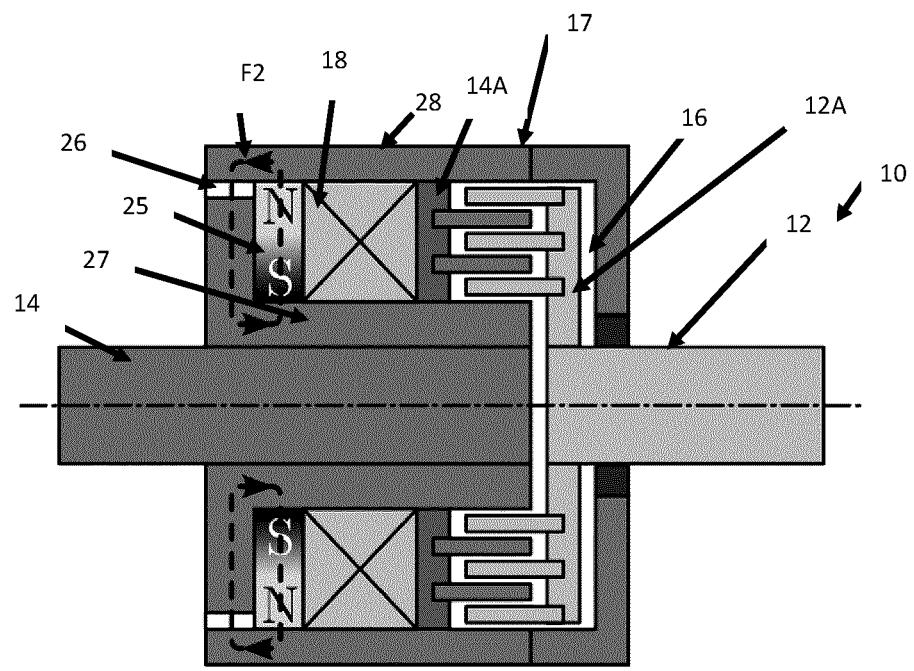
FIG. 2B is a partly sectioned view of the MR fluid clutch apparatus of FIG. 2A, with the coil in a powered state.

Referring to FIGS. 2A-2B, the MR fluid clutch apparatus 10 is shown in yet another schematic embodiment. The MR fluid clutch apparatus 10 of FIGS. 2A and 2B has numerous similar components with the MR fluid clutch apparatus 10 of FIG. 1 whereby like elements will bear like numeral references, and their description is not duplicated unnecessarily herein. A distinction lies in the presence of a permanent magnet 25 connected to the outer annular wall 28 of casing 17, in addition to the coil 18.

As shown in FIG. 2A, the permanent magnet 25 is used to generate a magnetic field F1 in the MR fluid clutch apparatus 10 so that the apparatus 10 can transfer torque without the need to apply a current via the coil 18. The permanent magnet 25 is radially magnetized and may be a full solid annular part or an assembly of individual magnets (such as cylindrical magnets). Gap 26, also known as a redirection gap, separates the part of the outer annular wall 28 of casing 17, i.e., the outer magnetic core, from the inner magnetic core 27.

When no current is applied to the coil 18 (power-off), as in FIG. 2A, magnetic field F1 is present in the MR fluid 16 according to the described magnetic flux path shown. Some magnetic flux circulates in the redirection gap 26. The width of the redirection gap 26 controls the amount of magnetic flux desired in the MR fluid, a.k.a. the desired power-off torque. If the redirection gap 26 is sufficiently wide, almost all the magnetic flux induced by the permanent magnet 25 goes through the MR fluid 16, leading to a high power-off torque. If the redirection gap 26 is radially narrower, the magnetic flux is shared between the MR fluid 16 and the redirection gaps 26, leading to a lower power-off torque. The MR fluid clutch apparatus 10 of FIGS. 2A and 2B is thus in a normally closed or normally partially closed condition as it transmits torque when the coil 18 is not powered.

Figure 2C:
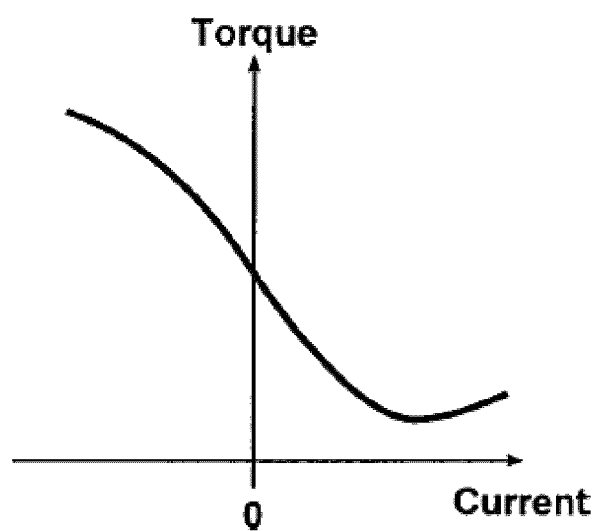
FIG. 2C is a schematic graph of torque as a function of current, for the MR fluid clutch apparatus of FIG. 2A.

As shown in FIG. 2B, when a current is applied in the coil 18 in order for the magnetic field generated to oppose to the indicated polarity of the permanent magnet 25, the magnetic flux induced by the permanent magnet 25 is redirected in the redirection gap 26 as shown by F2, which leads in a decrease of the magnetic flux in the MR fluid 16, hence causing a decrease of the torque transmittable by the MR fluid clutch apparatus 10 and consequently an increase in the slippage between the input member 12 and driven member 14. At a given intensity of the coil current, the magnetic flux F1 in the MR fluid can nearly be cancelled or non-negligibly reduced and beyond this intensity, it will increase again (as seen in FIG. 2C). The width of the redirection radial gap 26 may also have an impact on the size of the winding of the coil 18. If the width is larger, a bigger winding is required to redirect the magnetic flux. If the current is applied in the reverse direction, the coil 18 assists the permanent magnet 25 in the generation of magnetic flux in the MR fluid 16, leading to the increase of the transmittable torque of the MR clutch apparatus 10, again as shown in FIG. 2C.

MR fluid clutches apparatuses 10 may present dynamic behavior and hence it may be desirable to use multiple MR fluid clutch apparatuses to control one or multiple degrees of freedom (DOF) of a same apparatus. For example, a pair of MR fluid clutch apparatuses 10 may be used to operate antagonist forces of a single DOF. As another example, a set of MR fluid clutch apparatuses 10 may be used to each operate one of a plurality of DOFs of a system, in any form of application.

Figure 3:
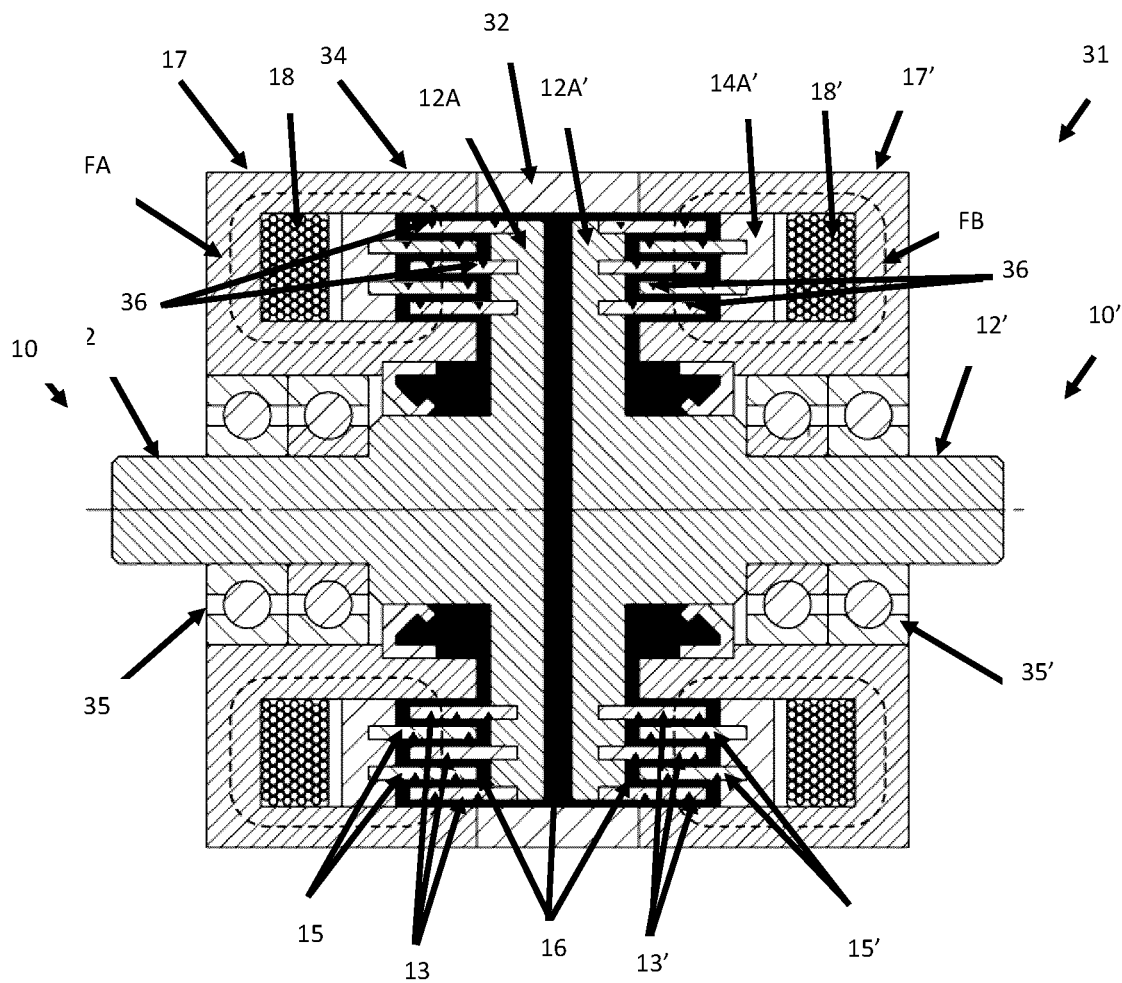
FIG. 3 is a sectional view of two MR fluid clutch apparatuses sharing the same fluid cavity.

Referring to FIG. 3, there is shown a MR fluid actuator 31 having a system of two MR fluid clutch apparatuses 10 and 10'. Both MR fluid clutch apparatuses 10 and 10' may be activated independently in order to transmit torque to the casing 34, for the casing 34 to turn. Casing 34 may be composed of casing portion 17 and casing portion 17'. In some conditions, the casing portions 17 and 17' may be separated by a separator 32 made from a material that does not support magnetic field (e.g., some stainless steels, copper or plastic, only to name a few). In FIG. 3, the MR fluid clutch apparatus 10 is similar to the MR fluid clutch apparatus 10' but oriented in opposite directions. In another arrangement, the MR fluid clutch apparatuses 10 and 10' may be of different type (e.g., one MR fluid clutch apparatus 10 or 10' may be of normally open type as in FIG. 1 and one MR fluid clutch apparatus 10 of 10' may be of normally closed type (with permanent magnet) as in FIG. 2A). Moreover, the MR fluid clutch apparatuses 10 and 10' may be of different size. MR fluid clutch apparatuses 10 and 10' are configured to receive a driving input from two independent sources—degrees of actuation (DOAs), namely via the driving member 12 and the driving member 12' coupled to torque sources. For example, the driving member 12 may provide a rotational input in a first orientation (e.g., clockwise), while the driving member 12' may provide a rotational input in the opposite orientation. Alternatively, the driving member 12' may provide a rotational input in the same orientation as driving member 12 for a redundant power input, or may be a stator to provide some form of braking input. It is to be noted that both the input members 12 and 12' may also receive input from the same source. It is also observed that the input members 12 and 12' are axially aligned about an axis of rotation of the casing 34.

Accordingly, in FIG. 3, the electromagnet 18 produces a magnetic field FA that causes transmission of rotation from the driving member 12 to the driven member 14A, by acting on the MR fluid 16 between the drums 13 and 15. Surface features, such as a helix groove 36, may be defined in at least some of the rotating surfaces of the drums 13 and 15. The electromagnet 18' produces a magnetic field FB that causes transmission of rotation from the driving member 12' to the driven member 14A' by acting on the MR fluid 16 between the drums 13' and 15'. If either one of the driving members 12 and 12' is a stator, the related magnet field FA or FB would block movement of the driven member 34. In yet another example of FIG. 3, the magnetic field FA and FB could cause rotations in different orientations of the driven member 34 (clockwise and counterclockwise). It is pointed out that the controller operating the electromagnet unit 18 may be programmed to avoid operating the electromagnets 18 and 18' in such a way that conflicting actuation is performed on the MR fluid clutch actuator 31, and safety features may be provided to avoid damaging the MR fluid actuator 31.

The MR fluid actuator 31 illustrated in FIG. 3 receives two DOAs and produces one output DOF, whether a bidirectional or unidirectional one, with two axial rotary DOAs (clockwise output DOA and counterclockwise output DOA, or a redundant output of same orientation) and one radial rotary output DOF. The stator may be regarded as providing a DOA as is it provides braking power.

As shown in FIG. 3, multiple DOA systems may require multiple MR fluid clutch apparatuses 10 for actuation. In some cases, each one of the multiple MR fluid clutch apparatuses 10 may have a different torque to transmit and a different duty cycle to sustain. In such conditions, the fluid of each MR fluid clutch apparatuses 10 will permanently change properties at a different rate. MR fluid 16 contained in a MR fluid clutch apparatus 10 that is subjected to higher load or higher duty cycle in a specific application may change property faster than the MR fluid 16 contained in a lower load or lower duty cycle MR fluid clutch apparatus 10. Also, multiple DOA systems may be solicited differently in the various DOA. In some conditions, it may present an advantage to have a method to average the accumulated energy in the MR fluid 16 of multiple MR fluid clutch apparatuses 10. According to the present disclosure, as exemplified by the embodiment of FIG. 3, the MR fluid actuator 31 averages the change of property of the MR fluid 16 in its two MR fluid clutch apparatuses 10/10' by having the same MR fluid shared between its MR fluid clutch apparatuses 10/10' forming a same mechanical system. By averaging the change of property of MR fluid between multiple MR fluid clutch apparatuses 10/10', it may prolong the life of the MR fluid clutch apparatuses 10 with a higher load or duty cycle and decrease the life of the MR fluid clutch apparatuses 10 with the lower load or lower duty cycle. In order to increase the averaging of change of property of MR fluid over multiple MR fluid clutches apparatuses, circulation features (e.g., pump or helix on one or more of the drums only to name a few) may be arranged in one or multiple clutch apparatuses 10. Natural or forced circulation of the MR fluid 16 between multiple MR fluid clutch apparatuses 10 may also be advantageous in order to keep the MR fluid 16 in the MR fluid actuator 31 to a more uniform temperature level. The MR fluid 16 solicited in one or more of the shear areas where there is an accumulation of energy may locally increase in temperature. Having MR fluid circulation between multiple MR fluid clutch apparatuses 10 may help in avoiding any "hot spot" while reducing the risk of degradation of the MR fluid that has a maximum operation temperature.

In the MR fluid actuator 31 of FIG. 3, MR fluid 16 is shared between the MR fluid clutch apparatus 10 and the MR fluid apparatus 10'. In addition to the benefit of averaging the change of property of the MR fluid between multiple MR fluid clutch apparatuses 10, sharing MR fluid between multiple MR fluid clutches may also result in a compact and lightweight design due to the sharing of a casing member. It may also result in fewer components to realize the same input/output.

Figure 4:
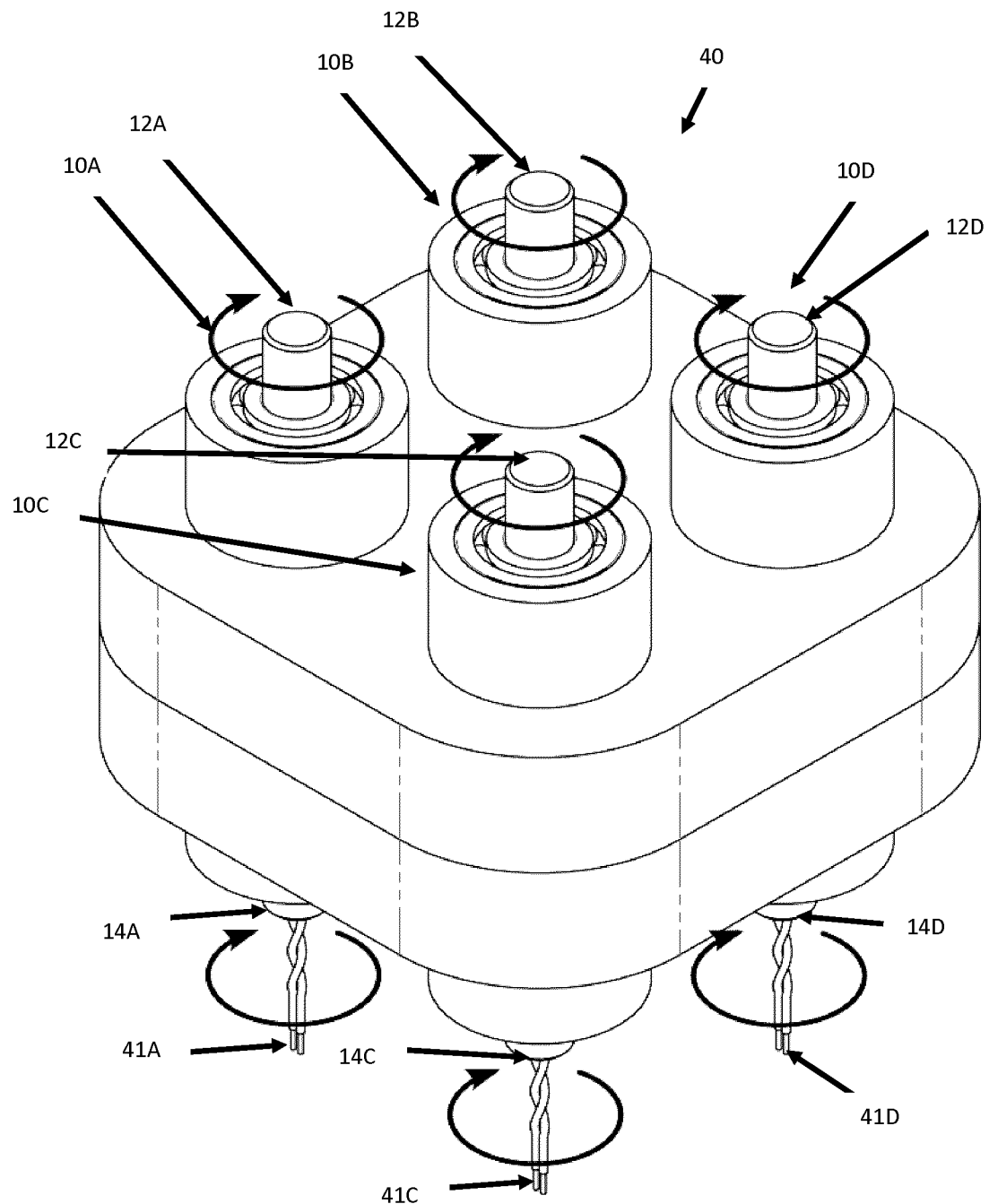
FIG. 4 is a perspective view of multiple MR fluid clutch apparatuses of twisting cable type sharing the same fluid cavity.

Referring to FIG. 4, there is shown a MR fluid actuator 40 including four MR fluid clutch apparatuses, identified as 10A, 10B, 100 and 10D. Four MR fluid clutch apparatuses 10 are shown here but the arrangement may be composed of two or more MR fluid clutch apparatuses 10 without any limit on the maximum number of MR fluid clutch apparatuses 10. The MR fluid clutch apparatuses 10 may be of normally open or normally closed type (or partially closed) and may be of various sizes. Input members 12A to 12D may receive power from the same source or from different sources. For example, the power source may be an electric motor, mechanical engine or other types of power sources may be used, such as hydraulic motors to name one among numerous other examples. Each individual MR fluid clutch apparatus 10A to 10D may be actuated independently. The driven members 14A to 14D may be the driven member in a direct drive. However, mechanisms/transmissions may be added between the driven members 14A-14D and an output member (not illustrated) instead of being a direct drive. For example, the output member may incorporate a reduction gearbox or like mechanism. The expression output member is used as an encompassing expression for equivalent parts, such as a pulley, a chainring, a sprocket, a nut, a screw, lever arm, etc. The driven members 14A to 14D may also be connected to other equipment, components, linkages, cable or any rotary-to-rotary converter or rotary-to-linear movement converter. In FIG. 4, there is illustrated multiple MR fluid clutch apparatuses 10A-10D arranged side by side with rotational axes being parallel but not collinear (as in FIG. 3). Other configurations like MR fluid clutch apparatuses 10 arranged in a row, only to name one, are considered.

Figure 5:
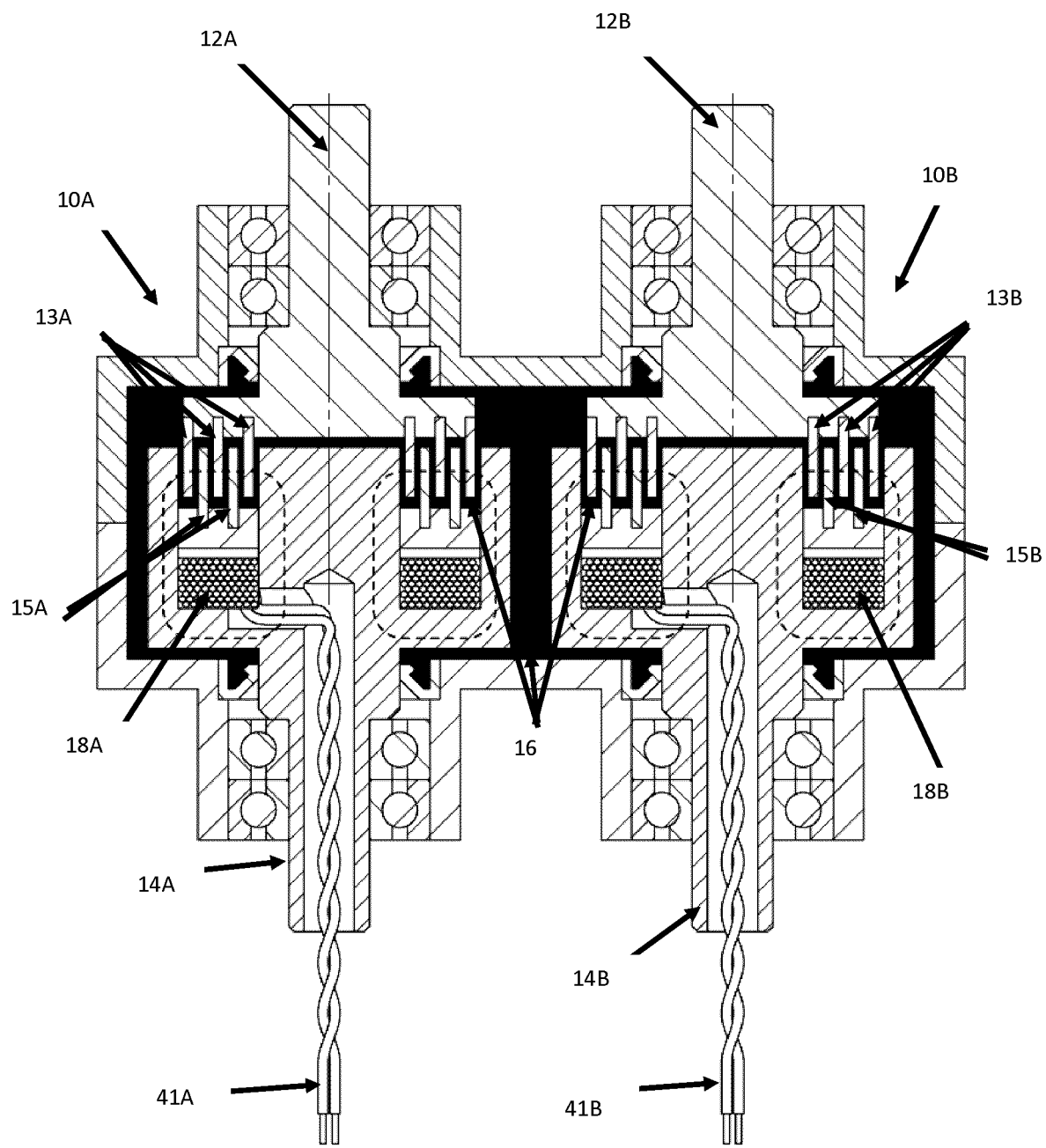
FIG. 5 is a sectioned view of the MR fluid clutch apparatuses of FIG. 4, sharing the same fluid cavity.

Referring to FIG. 5, there is shown a sectional view of the MR fluid clutch apparatus 40. Each MR fluid clutch 10A and 10B have their own input member, respectively 12A and 12B and driven member 14A and 14B. Each MR fluid clutch apparatus 10A and 10B also have their own coil 18A and 18B that may be actuated using pair of cables 41A and 41B. Pairs of cables are illustrated but other ways to transmit current to the coil may be used (i.e. single wire, wireless transmission, slip ring, only to name a few). In this arrangement, MR fluid 16 may flow in the MR fluid chamber of the MR fluid clutch apparatus 10A, i.e., the chamber including the space between the shear areas or MR fluid clutch apparatus 10A formed by intertwined drums 13A and 15A, other volumes of the MR fluid clutch apparatus 10A, including around input member 12A and around the driven member 14A. The MR fluid chamber extends to the MR fluid clutch apparatus 10B, such that the same bath or pool of MR fluid 16 is between the shear surfaces of MR fluid clutch apparatus 10B formed by intertwined drums 13B and 15B. The MR fluid 16 is also present in the volume of the chamber surrounding the input member 12B and surrounding the driven member 14B. MR fluid 16 may also flow to additional MR fluid clutch apparatuses of the MR fluid actuator 40, if any, as there are no obstacle in between them, i.e., the MR fluid clutch apparatuses 10 of the MR fluid actuator 40 form one common MR fluid chamber. It is to be noted that forced exchange/pumping features may be built in one or more of the MR fluid clutch apparatuses 10 in order to create movement of the MR fluid 16 and limit fluid stagnation in a same area of the MR fluid actuator 40 for an extended period of time. Features may take the form of an impeller or an helix on one or more of the drums, an independent pump, a gravity induced flow, pumping features on the drive members 12 or driven members 14, only to name few examples. MR fluid 16 in the shear area of MR fluid clutch apparatus 10A may move toward the area in between MR fluid clutch apparatus 10A and MR fluid clutch apparatus 10B and then later move toward the shear area of MR fluid clutch apparatus 10B. During the movement of MR fluid 16, the MR fluid 16 may mix and the accumulation of energy of the fluid may be shared by heat transfer among the total volume of MR fluid 16 present in the MR fluid actuator 40 and not only in the MR fluid 16 contained in a single one MR fluid clutch apparatuses 10.

In the illustrated embodiment of FIG. 4 and FIG. 5, the driven members 14A and 14B have their shafts projecting outside the MR fluid chamber. However, in some applications, it may present the advantage to have the driven member(s) 14 connected to an output member directly in the MR fluid chamber. For example, driven member 14 may be connected to a pulley and a cable system located in the MR fluid chamber and the cable may exit the chamber by going through a hole and seal system.

Figure 6:
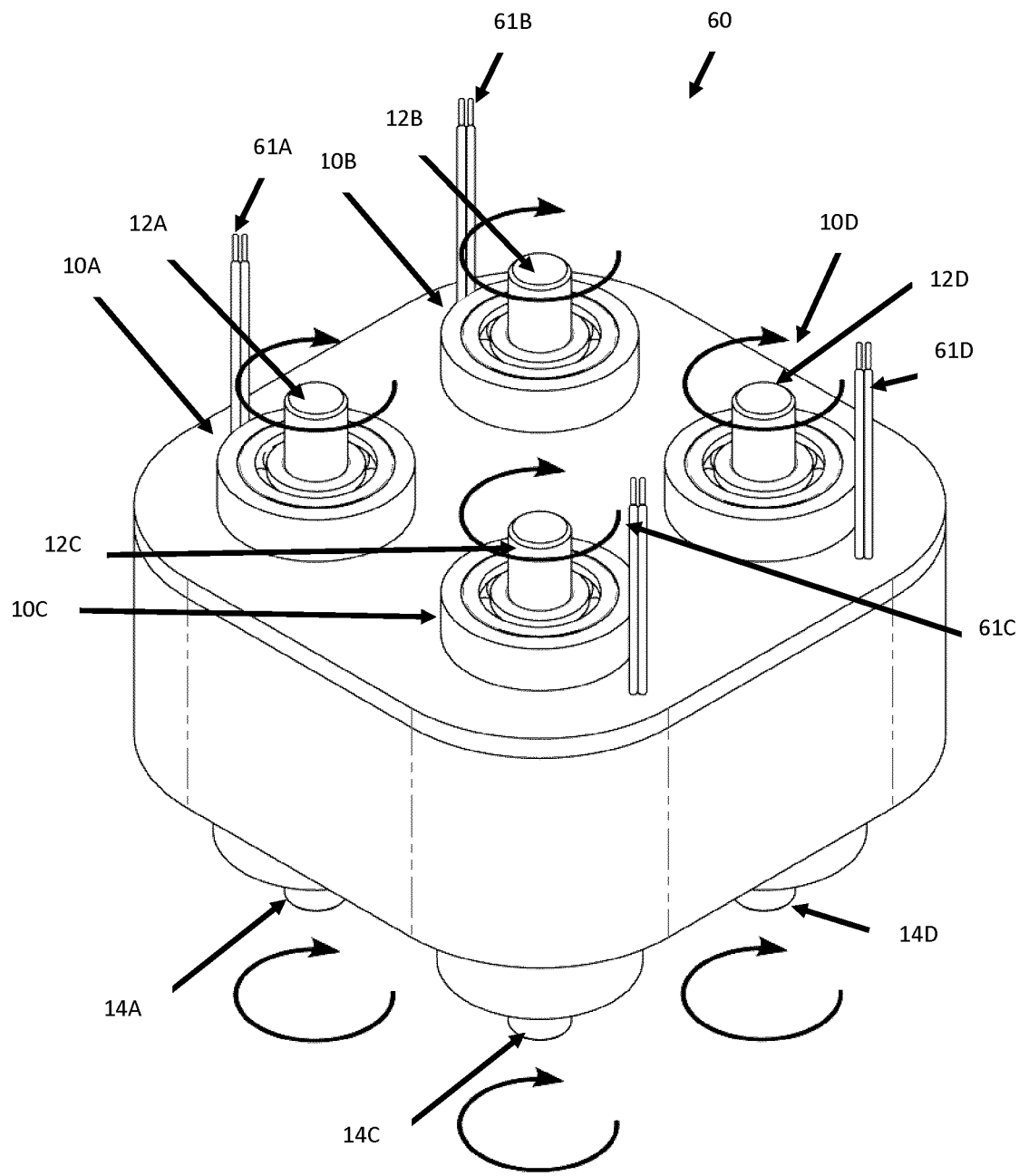
FIG. 6 is a schematic view of multiple MR fluid clutch apparatuses of fluid gap type sharing the same fluid cavity.

Referring to FIG. 6, there is illustrated a MR fluid actuator 60 similar to MR fluid actuator 40 of FIG. 4, whereby like components will bear like reference numerals. The MR fluid actuator 60 is shown as having four MR fluid clutch apparatuses 10A-10D, but may have two or more MR fluid clutch apparatuses. The MR fluid actuator 60, instead of using twisted cables to transmit energy to the coils 18, uses MR fluid clutch apparatuses 10 of fluid gap type, i.e, with the coils 18 separated from the drive members 12 by fluid gaps. This type of MR fluid clutch apparatus 10 may present the advantage that the electrical wires 61 do not rotate, hence may be less prone to damage or wear.

Figure 7:
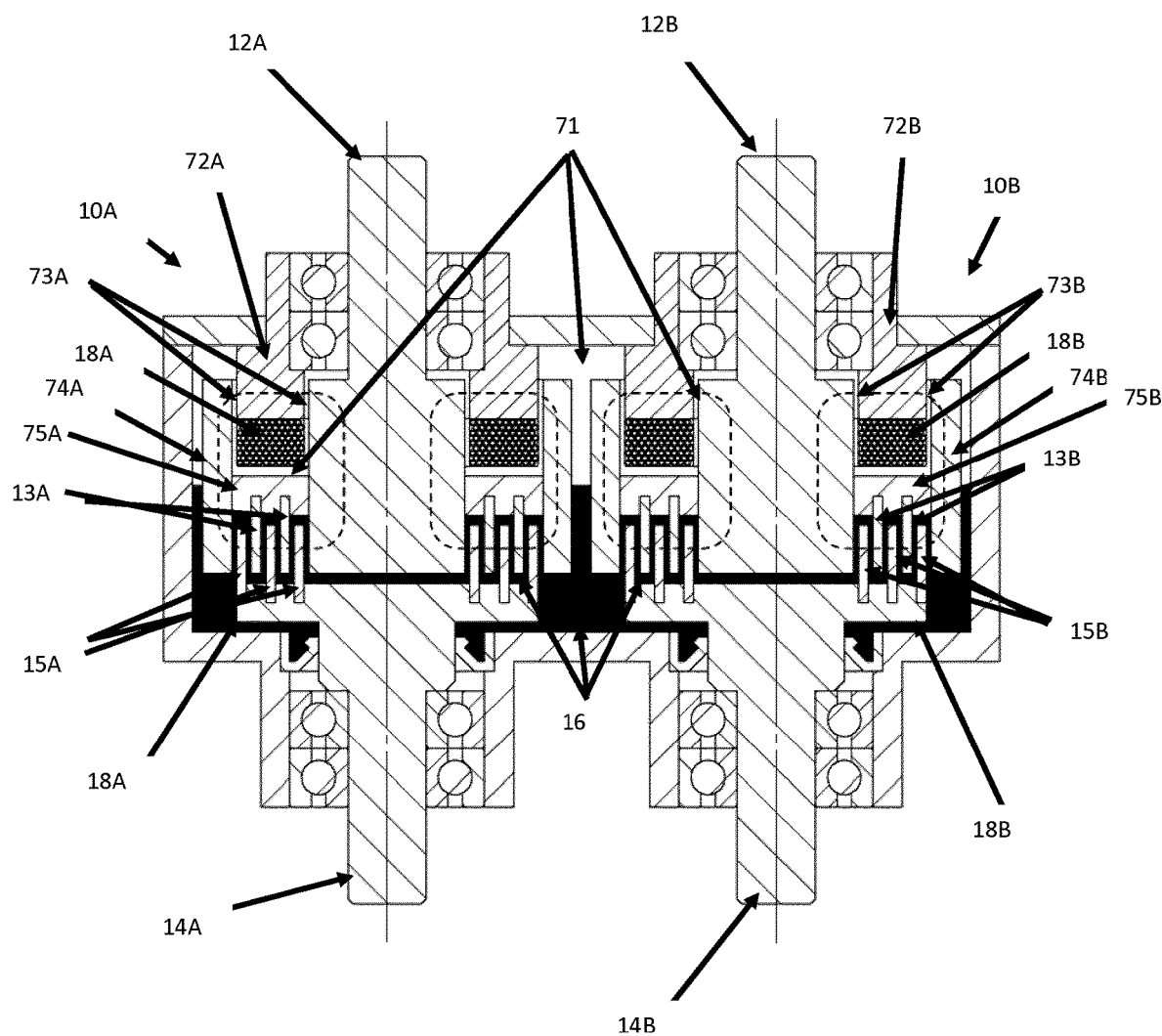
FIG. 7 is a sectioned view of the MR fluid clutch apparatuses of FIG. 6, sharing the same fluid cavity.

Referring to FIG. 7, there is shown a sectioned view of the MR fluid actuator 60. Each MR fluid clutch apparatus 10 (10A and 10B shown, (10C and 10D hidden) have their own input member 12 (with components shown with A or B affixed to them in the figures to discriminate between the MR fluid clutch apparatuses 10A, 10B), and driven member 14. Each MR fluid clutch apparatus 10 also has its own coil 18 that may be actuated using a pair of cables, 61. Coils 18 are mounted on fixed stators 72, and the produced magnetic field has to cross fluid gap 73 in order to reach the input rotor outer magnetic rings 74, and to reach the magnetic portions of the input rotors 12. Input rotor outer magnetic rings may be attached to the inner input rotor 12 by using supports 75 that may be made from non-magnetic material. The input rotors 12 may be built from a single component as in FIG. 7, but they also may be built from multiple components.

It is shown in FIG. 7, that a single MR fluid chamber is defined, with the MR fluid clutch apparatuses 10 of the MR fluid actuator 60 sharing the MR fluid chamber. In the configuration of the MR fluid actuator 60 illustrated in FIG. 7, the MR fluid 16 may not completely fill the MR fluid chamber, and the MR fluid actuator 60 in use is orientated in the manner shown, i.e., with the rotational axes being vertical. A level of MR fluid may be maintained high enough in order to assure that the shear areas between the drums 13 and 15 is fully immersed. The volume above the level of MR fluid 16 may be filled with fluid 71 that does not change its viscosity when exposed to the magnetic field. Fluid 71 may be air or any other fluid or gas that is not miscible with the MR fluid 16. Fluid 71 may be of different density than MR fluid 16 to assist in remaining separate from the MR fluid 16. It is to be noted that a passage may be created in support 75 for any of the MR fluid 16 that would have reached the fluid gaps, i.e., the cavity between the coil 18 area and the rotor components 74, 75 and 12, to drain back to the MR fluid in the MR fluid chamber. Embodiment is shown with MR fluid 16 at the bottom of the unit but a reverse construction may be contemplated if the fluid 71 is of a higher density than the MR fluid 16.

Figure 8:
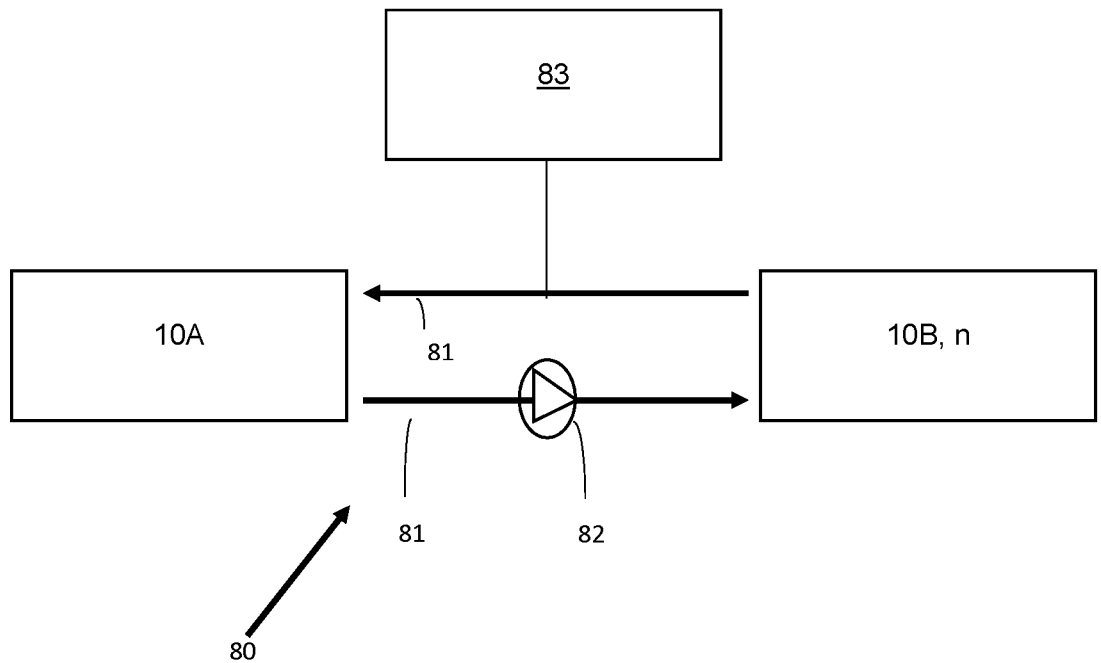
FIG. 8 is a schematic view of separate MR fluid clutch apparatuses with shared MR fluid capacity.

In FIGS. 3-7, there is illustrated MR fluid clutch apparatuses 10 build into a single casing unit, i.e., forming a single MR fluid chamber. Referring to FIG. 8, in an arrangement shown as 80, it is also contemplated to have independent MR fluid clutch apparatuses 10A, 10B, 10n linked in fluid communication with each other by tubes, pipes, other type of conduit or channel 81, to allow MR fluid movement between MR fluid clutch apparatuses 10. In any of the examples of FIGS. 3 to 8, a MR fluid pump 82 may be used to assure circulation and mixing of the MR fluid between multiple MR fluid clutch apparatuses 10. As an alternative to a pump, any pressure differential generating device may also be used to generate MR fluid flow between independent MR fluid clutch apparatuses 10. Also, in any of the configurations described above or herein, an internal or external reservoir 83 may be present that may help keeping the MR fluid clutch apparatuses 10 full while also acting as an expansion chamber. Additionally, a fluid exchange system may be present to change part of all the degraded MR fluid 16 with new MR fluid 16.

The present application therefore relates to a method for operating a system of magnetorheological (MR) fluid clutch apparatuses 10/10' by: actuating a first coil 18 to deliver a magnetic field through MR fluid 16 in a first MR fluid clutch apparatus 10 to selectively transmit actuation by the first MR fluid clutch apparatus 10; actuating a second coil 18 to deliver a magnetic field through MR fluid 16 in a second MR fluid clutch apparatus 10 to selectively transmit actuation by the second MR fluid clutch apparatus 10; and causing a portion of the MR fluid 16 in the MR fluid clutch apparatus 10 to flow to the second MR fluid clutch apparatus 10. Causing a portion of the MR fluid 16 in the first MR fluid clutch apparatus 10 to flow to the second MR fluid clutch apparatus 10 may include pumping the portion of the MR fluid 16. The MR fluid flows also from the second MR fluid clutch apparatus 10 to the first MR fluid clutch apparatus 10. Pumping the portion of MR fluid 16 may include pumping the portion of the MR fluid 16 by a pump in a conduit fluidly connecting the MR fluid clutch apparatuses 10. Pumping the portion of MR fluid 16 may include pumping the portion of the MR fluid 16 by at least one pumping feature on at least one shear surface of at least one of the MR fluid clutch apparatuses 10. Causing a portion of the MR fluid 16 in the MR fluid clutch apparatus 10 to flow to the second MR fluid clutch apparatus 10 includes having the MR fluid clutch apparatuses share a common pool of MR fluid 16.

The invention claimed is:

1. A system comprising:
at least a first and a second magnetorheological fluid clutch apparatuses, each said magnetorheological fluid clutch apparatus including at least
a first rotor having at least one first shear surface,
a second rotor rotating about a common axis with the first rotor, the second rotor having at least one second shear surface opposite the at least one first shear surface, the shear surfaces separated by at least one annular space,
magnetorheological (MR) fluid in an MR fluid chamber including the at least one annular space, the MR fluid configured to generate a variable amount of torque transmission between the rotors when subjected to a magnetic field, and
at least one coil actuatable to deliver a magnetic field through the MR fluid such that each said magnetorheological fluid clutch apparatus is actuatable to selectively transmit actuation by controlled slippage of the rotors with respect to one another; and
the MR fluid chambers of at least the first and the second magnetorheological fluid clutch apparatuses being in fluid communication for the MR fluid to circulate between at least the first and the second magnetorheological fluid clutch apparatuses.

2. The system according to claim 1, comprising a single casing for the magnetorheological fluid clutch apparatuses, the single casing defining a single MR fluid chamber combining the MR fluid chambers of the magnetorheological fluid clutch apparatuses to form a single pool of MR fluid.

3. The system according to claim 2, wherein the single casing defines the second rotor of both the first and the second magnetorheological fluid clutch apparatuses.

4. The system according to claim 3, wherein the first rotor of one of the first and the second magnetorheological fluid clutch apparatuses is fixed to brake the second rotor.

5. The system according to claim 2, wherein the common axes of the magnetorheological fluid clutch apparatuses are parallel and non-collinear.

6. The system according to claim 5, wherein input members of each of the first rotors are on a first side of the casing, and driven members of each of the second rotors are on a second side of the casing.

7. The system according to claim 1, further comprising at least one conduit between the MR fluid chamber of the first MR fluid clutch apparatus and the MR fluid chamber of the second MR fluid clutch apparatus, for MR fluid flow therethrough.

8. The system according to claim 7, further comprising a pumping device in the at least one conduit for inducing the MR fluid flow between the MR fluid chambers.

9. The system according to claim 1, wherein at least one of the magnetorheological fluid clutch apparatuses further comprises a stator adapted to be connected to a structure, the stator having at least an annular wall, the first rotor and the second stator rotatably mounted to the stator, an inner magnetic core and an outer magnetic core with an annular cavity therebetween receiving the annular wall of the stator, the inner magnetic core and the outer magnetic core connected to at least one of the rotors to rotate therewith so as to be rotatably mounted to the stator, outer and inner fluid gaps between the inner magnetic core and the annular wall, and between the outer magnetic core and the annular wall, the outer and inner fluid gaps filled with at least one fluid other than the MR fluid, and wherein the magnetic field from the at least one coil follows a path comprising the annular wall, the outer fluid gap, the outer magnetic core, the at least one first shear surface and the at least one second shear surface, the inner magnetic core and the inner fluid gap.

10. The system according to claim 1, further comprising at least one pumping feature in at least one of the MR fluid chambers to cause a flow of the MR fluid.

11. The system according to claim 10, wherein the pumping feature is on one of the first rotor and the second rotor.

12. The system according to claim 10, wherein the pumping feature is at least one groove in at least one of the shear surfaces.

13. The system according to claim 1, further comprising a reservoir for MR fluid in fluid communication with at least one MR fluid chamber.

14. The system according to claim 13, wherein the reservoir is connected to the at least one MR fluid chamber by a conduit.

15. The system according to claim 1, wherein the at least one coil is a wireless power transmission coil.

* * * * *